US012595073B2

(12) United States Patent (10) Patent No.: US 12,595,073 B2
Farnaud (45) Date of Patent: Apr. 7, 2026

(54) METHOD FOR ANALYZING AN AIRCRAFT ELECTRICAL STRUCTURE BY SEARCHING FOR EQUIPOTENTIALS IN EMBEDDED GRAPHS

(71) Applicant: AIRBUS OPERATIONS (S.A.S.), Toulouse (FR)

(72) Inventor: Ludovic Farnaud, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 284 days.

(21) Appl. No.: 18/339,951

(22) Filed: Jun. 22, 2023

(65) Prior Publication Data

US 2024/0083593 A1     Mar. 14, 2024

(30) Foreign Application Priority Data

Jun. 22, 2022     (FR) ...................................... 2206182

(51) Int. Cl.
B64D 45/00 (2006.01)

(52) U.S. Cl.
CPC .......... B64D 45/00 (2013.01); B64D 2221/00 (2013.01)

(58) Field of Classification Search
CPC .... B64D 45/00; G01R 31/003; G01R 31/005; G01R 31/007; G01R 31/008; G01R 31/08; G01R 31/083; G01R 31/11; G06F 30/15
See application file for complete search history.

(56) References Cited

U.S. PATENT DOCUMENTS

2003/0206111 A1* 11/2003 Gao ................... G01R 31/1272
340/635
2009/0228223 A1* 9/2009 Liu ...................... G01R 31/008
361/62

(Continued)

OTHER PUBLICATIONS

Chuang Gao et al., "Research on Online Detection and Location of Y Shaped Cable Networks Faults", 2017 International Conference on Sensing, Diagnostics, Prognostics, and Control (SDPC), IEEE, Aug. 16, 2017, pp. 80-85.

(Continued)

*Primary Examiner* — Huy Q Phan
*Assistant Examiner* — David B Frederiksen
(74) *Attorney, Agent, or Firm* — Nixon & Vanderhye P.C.

(57)     ABSTRACT
An aircraft electrical structure comprises equipment items that are interconnected by cables. A processing system constructs (400) a digital representation of the electrical structure in the form of nested graphs. A first graph represents the electrical structure by first arcs representing the cables and first nodes representing the equipment items. A second graph represents an internal interconnection structure between at least one input and at least one output of each equipment item which has such an internal interconnection structure, second arcs representing interconnections between inputs and outputs, second nodes representing the inputs and the outputs concerned. The first graph is obtained from contextual data (411) describing the electrical structure and each second graph is obtained from a generic model (412) for each type of equipment item concerned. An analysis is carried out by performing a search (404) for equipotentials by browsing through the nested graphs. Thus, the analysis is facilitated.

4 Claims, 3 Drawing Sheets

(56) References Cited

U.S. PATENT DOCUMENTS

| | | | | |
|---|---|---|---|---|
| 2012/0246522 | A1* | 9/2012 | Frayssignes | ........ G06F 11/0739 |
| | | | | 714/48 |
| 2017/0344558 | A1* | 11/2017 | Chen | .................. G06F 16/9024 |
| 2019/0055033 | A1* | 2/2019 | Donadille | ............... H02J 13/00 |
| 2019/0333294 | A1* | 10/2019 | Sundareswara | ...... G07C 5/0808 |

OTHER PUBLICATIONS

Moussa Kafal et al., "Blind Diagnosis of a Black-Boxed Fully-Loaded Wiring Network for Configuration Structuring and Fault Monitoring", 2018 IEEE International Instrumentation and Measurement Technology Conference (12MTC), May 14, 2018, pp. 1-6, IEEE.

O. Osman et al., "Wired Network Distributed Diagnosis and Sensors Fusion by Multi-carrier Time Domain Reflectometry and Graph Theory", 2019 Photonics & Electomagnetics Research Symposium-Spring (Piers-Spring), Jun. 17, 2019, pp. 3086-3092, IEEE.

French Search Report for FR2206182 dated Jan. 27, 2023, 2 pages.

* cited by examiner

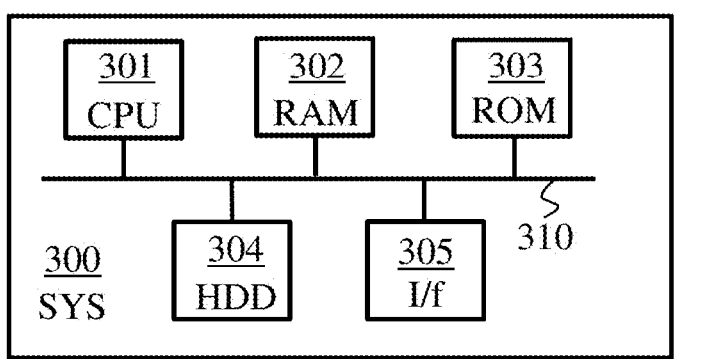

| 301 CPU | 302 RAM | 303 ROM |
|---------|---------|---------|

300 SYS    | 304 HDD | 305 I/f |    310

Contextual data    Generic models

401   Detection of failure or fault

402   Measurement by reflectometry

400   Construction of an electrical structure representation based on graphs

403   Obtaining of an electrical structure representation based on graphs

404   Search for equipotentials by browsing through the graphs

405   Provision of a search result

406   Intervention

Fig. 4

METHOD FOR ANALYZING AN AIRCRAFT ELECTRICAL STRUCTURE BY SEARCHING FOR EQUIPOTENTIALS IN EMBEDDED GRAPHS

TECHNICAL FIELD

The present invention relates to the field of the construction of digital representations of aircraft electrical circuits. The present invention relates also to the field of locating and repairing of failures in electrical structures installed in an aircraft.

STATE OF THE ART

Many equipment items of an aircraft are powered using electrical structures, including cables, looms and interconnection equipment items. That can represent many kilometres of cables within the aircraft.

To locate failures or faults in such communication structures, reflectometry tools are typically used. Reflectometry is a diagnostic method which is based on the radar principle. A probe signal is injected into the electrical structure, and when this probe signal encounters an impedance discontinuity, a portion of its energy is reflected to the injection point. A fine analysis of this reflected energy makes it possible to deduce information on the real characteristics of the electrical structure. This technique is more particularly used to investigate, when an aircraft is being assembled, a failure or a fault in an electrical structure of the aircraft.

Thus, using reflectometry, it is possible to determine the distance in the electrical structure at which a break exists with respect to a termination point of the electrical structure, such as a connector. However, currently, with this distance information, an operator seeking the exact location of the failure or the fault begins an arbitrary search by examining previously selected plans of the wiring of the electrical structure of the aircraft, in order to identify potential locations of the failure or of the fault. The experience and the intuition of the operator are then very important for choosing which elements of the aircraft to dismantle, for example cabin cladding panels, to access portions of electrical structures where the failure or the fault is likely to be located. In addition to the time-consuming nature of this approach, the unnecessary dismantling of elements of the aircraft, such as the cabin cladding panels mentioned above, leads to a risk of damage to them.

It is then desirable to mitigate these drawbacks of the state of the art. It is notably desirable to provide a solution which makes it possible to simplify the locating and the repairing of failures or faults in electrical structures installed in an aircraft.

SUMMARY OF THE INVENTION

To this end, a method is proposed for analysing an electrical structure of an aircraft, the electrical structure comprising equipment items interconnected by cables, the method comprising the following steps performed by a processing system in the form of electronic circuitry: constructing a digital representation in the form of nested graphs of the electrical structure, a first graph representing the electrical structure by first nodes and first arcs, the first arcs representing the cables of the electrical structure, the first nodes representing the equipment items of the electrical structure interconnected by the cables, and a second graph representing an internal interconnection structure between at least one input and at least one output of the equipment items which have an internal interconnection structure out of the equipment items of the electrical structure, second arcs representing interconnections of the internal interconnection structure between inputs and outputs, second nodes representing the inputs and the outputs, the first graph being obtained from contextual data relating to the electrical structure and each second graph being obtained from a generic model associated with a type of equipment to which the equipment item concerned corresponds; and performing the analysis by performing a search for equipotentials in the digital representation by browsing through the nested graphs. Thus, the construction of the digital representation is particularly facilitated through the use of a generic model for each type of equipment, which makes it possible to obtain a digital representation with nested graphs, and thus facilitates the analysis by a graph-browsing algorithm.

Also proposed is a computer program product, which can be stored on a medium and/or downloaded from a communication network, in order to be read by a processor. This computer program comprises instructions for implementing the abovementioned method, when said program is run by a processor. Also proposed is a non-transient information storage medium on which such a computer program is stored.

In a particular embodiment, the analysis relates to a diagnosis of a fault or of a failure in the electrical structure of the aircraft, the method comprising the following steps: performing a reflectometry operation on the electrical structure from a termination point or an input of one said equipment item or an output of one said equipment item, and determining, through the reflectometry operation, the distance in the electrical structure at which a break exists with respect to said termination point or to said input of the equipment item concerned or to said output of the equipment item concerned. Furthermore, the method is such that the search for equipotentials is performed from the node corresponding to said termination point or said input of the equipment item concerned or said output of the equipment item concerned.

In a particular embodiment, the browsing of the nested graphs is performed using a deep browsing algorithm.

Also proposed is a processing system configured to perform an analysis of an electrical structure of an aircraft, the electrical structure comprising equipment items interconnected by cables, the processing system being in the form of electronic circuitry configured to construct a digital representation in the form of nested graphs of the electrical structure, a first graph representing the electrical structure by first nodes and first arcs, the first arcs representing the cables of the electrical structure, the first nodes representing the equipment items of the electrical structure interconnected by the cables, and a second graph representing an internal interconnection structure between at least one input and at least one output of the equipment items which have an internal interconnection structure out of the equipment items of the electrical structure, second arcs representing interconnections of the internal interconnection structure between inputs and outputs, second nodes representing the inputs and the outputs, the first graph being obtained from contextual data relating to the electrical structure and each second graph being obtained from a generic model associated with a type of equipment to which the equipment item concerned corresponds; and performing the analysis by performing a search for equipotentials in the digital representation by browsing through the nested graphs.

BRIEF DESCRIPTION OF THE DRAWINGS

The features of the invention mentioned above, and others, will become more clearly apparent on reading the following description of at least one exemplary embodiment, said description being given in relation to the attached drawings, among which:

FIG. 3 schematically illustrates an example of hardware platform configured to construct a digital representation of the electrical structure and to use this digital representation notably to search for a fault or a failure in the electrical structure; and FIG. 4 schematically illustrates a flow diagram of a method for constructing a digital representation of the electrical structure and of use of this digital representation to search for a fault or a failure in the electrical structure.

DETAILED EXPLANATION OF EMBODIMENTS

Figure 1:
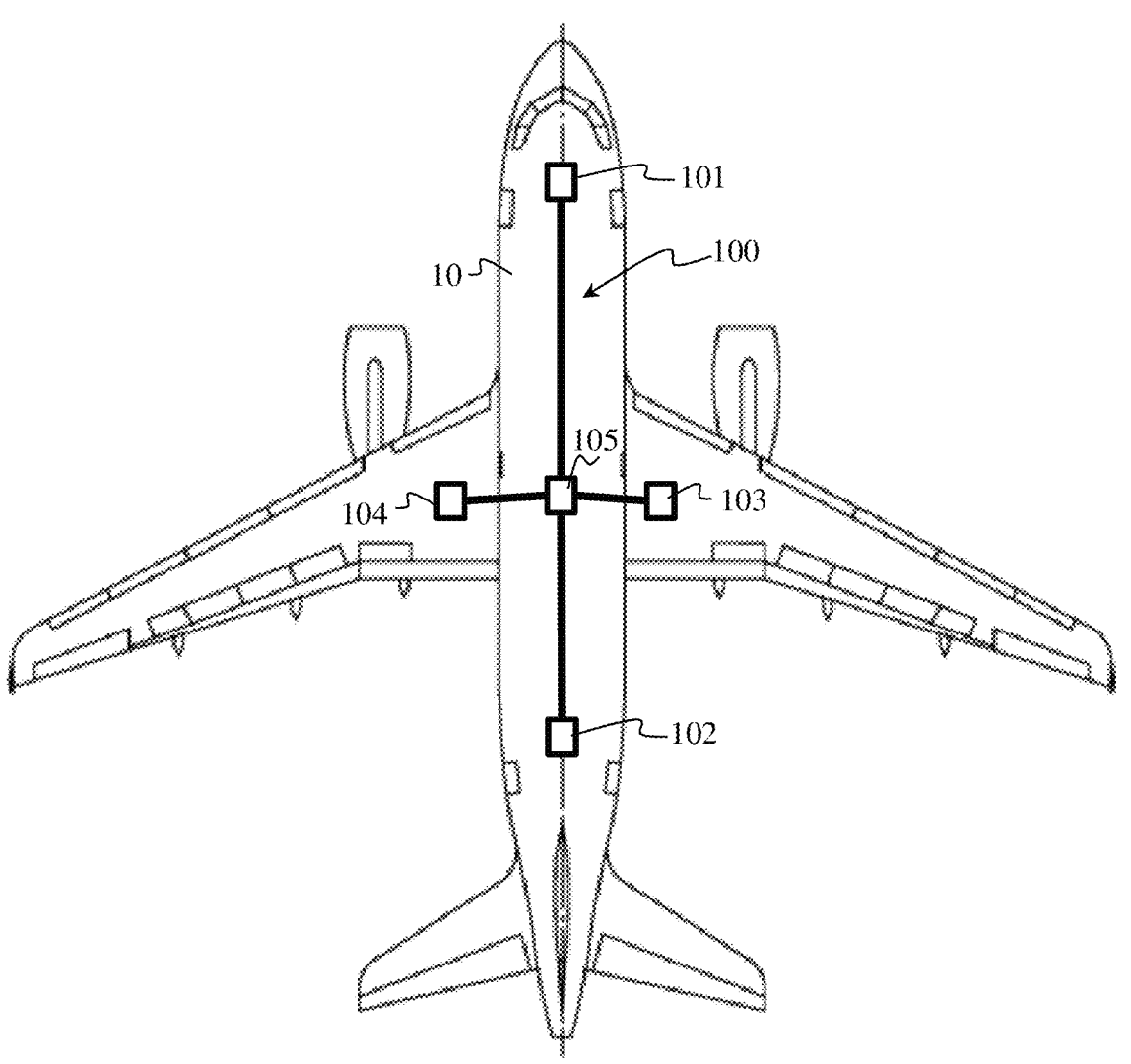
FIG. 1 schematically illustrates, in a top view, an aircraft equipped with at least one electrical structure.

FIG. 1 thus schematically illustrates, in a top view, an aircraft 10. The aircraft 10 comprises one or more electrical structures 100 making it possible to interconnect equipment items 101 to 104, such as power sources, connectors and loads. Each electrical structure comprises cables and interconnection devices 105, such as cable looms, connectors and switches. As detailed hereinbelow, the electrical structure is described by a first graph.

Each interconnection device 105 comprises an internal interconnection structure making it possible to interconnect one or more inputs of said interconnection device 105 and one or more outputs of said interconnection device 105. As detailed hereinbelow, the internal interconnection structure is described by a second graph. It should be noted that each equipment item 101 to 104 can also include such an internal interconnection structure.

FIG. 1 represents, purely illustratively, four equipment items 101 to 104 interconnected by a cabling and an interconnection device 105, but modern aircraft typically comprise such electrical structures 100 with a much greater quantity of elements.

Figure 2A:
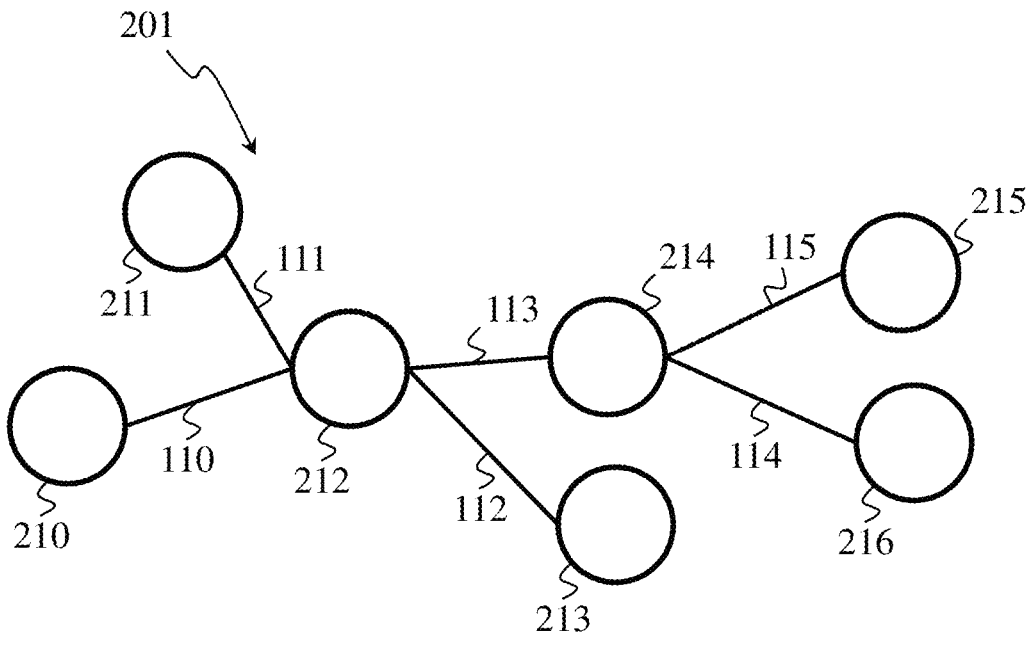
FIG. 2A schematically illustrates an example of a first graph representing a part of the electrical structure.

FIG. 2A schematically illustrates an example of a first graph 201 representing a part of an electrical structure. The first graph 201 comprises arcs 110 to 115, also called edges, representing cables of the electrical structure. The first graph 201 also comprises nodes 210 to 216, also called vertices, representing equipment items of the electrical structure interconnected by the cables concerned. The equipment items concerned are interconnection devices 105 or termination points, such as power outlets or connectors. In the example of FIG. 2A, the node 210 is linked to the node 212 by the arc 110, which represents a termination point (node 210) connected by a cable (arc 110) to an interconnection device (node 212). Also, in the example of FIG. 2A, the node 212 is linked to the node 213 by the arc 113, which represents an interconnection device (node 212) connected by a cable (arc 113) to another interconnection device (node 213). The arcs 110 to 115 thus represent the equipotential links between the equipment items 101 to 104 and interconnection devices 105.

The entire electrical structure 100 can thus be described by graphs.

Figure 2B:
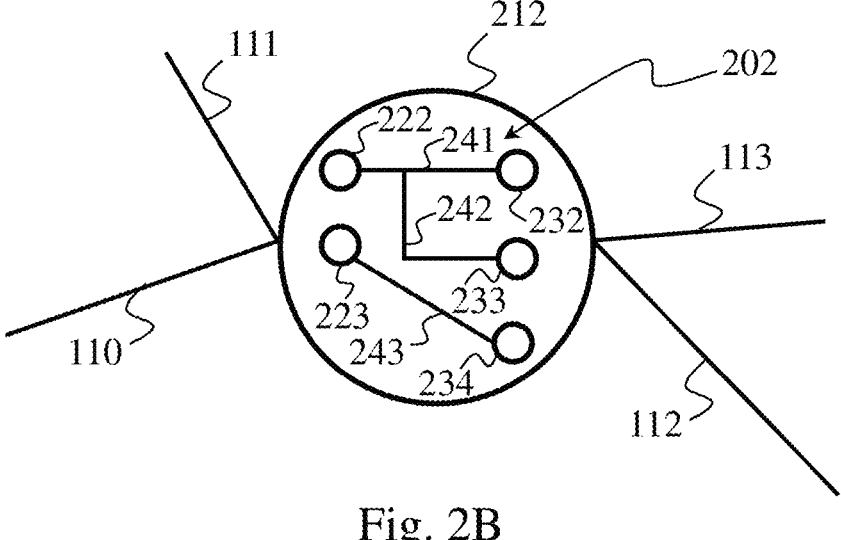
FIG. 2B schematically illustrates an example of a second graph representing an internal interconnection structure of an interconnection device in the electrical structure represented by the first graph of FIG. 2A.

FIG. 2B schematically illustrates an example of a second graph 202 representing the interconnection structure internal to the interconnection device 105 which is represented by the node 212 in the first graph 201. The second graph 202 comprises arcs 241 to 243 (or edges) representing internal electrical links of the interconnection device 105 represented by the node 212 in the first graph 201. These internal electrical links link inputs to outputs of the interconnection device 105. In the second graph 202, the inputs of the interconnection device 105 are represented by nodes 222 and 223 (or vertices), and the outputs of the interconnection device 105 are represented by nodes 232 to 234.

The entire interconnection structure internal to the interconnection device 105 can thus be described by a graph. This graph can differ from one configuration to another of the interconnection device 105. For example, if the interconnection device 105 comprises a switch, the internal interconnection structure is different depending on whether the switch concerned is open or closed. The equipotentials of the interconnection structure internal to the interconnection device 105, and therefore of the electrical structure 100, then differ typically from one configuration to another of the interconnection device 105.

Thus, in light of FIGS. 2A and 2B, in a given context or a given configuration, the electrical structure 100 of the aircraft 10 can be represented by two levels of graphs that are nested. As explained hereinbelow, this approach facilitates the construction of the digital representation of the electrical structure 100 of the aircraft 10, as well as the search for equipotentials in the electrical structure 100 of the aircraft 10, by browsing through these nested graphs, in order in particular to assist in locating a failure or fault in the electrical structure 100 of the aircraft 10.

FIG. 3 schematically illustrates an example of a hardware platform of a processing system 300, in the form of electronic circuitry, which is adapted and configured to construct a digital representation of the electrical structure 100, based on nested graphs, and to use this digital representation notably to search for the equipotentials in the electrical structure 100.

The hardware platform then comprises, linked by a communication bus 310: a processor or CPU (central processing unit) 301; a read-only memory RAM 302; a read-only memory 303, for example of ROM (read-only memory) or EEPROM (electrically-erasable programmable ROM) type; a storage unit 304, such as a hard disk HDD (hard disk drive), or a storage medium reader, such as an SD (secure digital) card reader; and an interface manager I/f 305.

The interface manager I/f 305 makes it possible to interact with one or more peripheral equipment items and/or a communication network. For example, the interface manager I/f 305 is adapted and configured to make it possible to interact with a human operator in order to receive contextual data for the construction of the digital representation of the electrical structure 100, in order also to receive equipotential search parameters in the electrical structure 100, and finally to supply (e.g. display) a result of the search for equipotentials in the electrical structure 100.

The processor 301 is capable of executing instructions loaded into the random-access memory 302 from the read-only memory 303, from an external memory, from a storage medium (such as an SD card), or from a communication network. When the hardware platform is powered up, the processor 301 is capable of reading instructions from the random-access memory 302 and of executing them. These instructions form a computer program causing the implementation, by the processor 301, of all or part of the steps and operations described here.

All of the steps and operations described here can thus be implemented in software form by the execution of a set of instructions by a programmable machine, for example a processor of DSP (digital signal processor) type or a microcontroller, or be implemented in hardware form by a machine or a dedicated electronic component (chip) or a dedicated set of electronic components (chipset), for example an FPGA (field-programmable gate array) or ASIC (application-specific integrated circuit) component. Generally, the hardware platform comprises electronic circuitry adapted and configured to implement the operations and steps described here.

FIG. 4 schematically illustrates a flow diagram of a method for constructing a digital representation of the electrical structure 100 and use of this digital representation to search for the equipotentials in the electrical structure 100, in order to assist in locating and correcting a failure or a fault in the electrical structure 100 of the aircraft 10.

In a step 400, the processing system 300 constructs the digital representation of the electrical structure 100. To do this, the processing system 300 uses contextual data 411 of the electrical structure 100 and generic models 412 of the interconnection devices 105 and of the equipment items 101 to 104 of the electrical structure 100.

The contextual data 411 are a description of the electrical structure 100, with its cables and the various equipment items that these cables interconnect. In this description, the cables are at least characterized by their length. In this description, the different equipment items are characterized by their type. Each type of equipment item has its associated generic model 412. Each generic model 412 defines each input and each output that the equipment item, of the type associated with the generic model 412 concerned, possibly comprises, as well as at least one internal interconnection structure provided that the equipment item comprises at least one input and at least one output. When an equipment item has several possible internal structures according to a configuration of said equipment item (e.g. switch open/closed, as already mentioned), the contextual data 411 specify which configuration is applicable to said equipment item, which defines the effective internal interconnection structure of said equipment item.

In the step 400, the processing system 300 constructs the digital representation of the electrical structure 100 in the form of graphs. A first graph represents the electrical structure 100 by nodes and arcs according to the principles set out hereinabove in relation to FIG. 2A. A second graph represents each internal interconnection structure of equipment of the electrical structure 100.

Thus, by virtue of the use of the generic models 412, the digital representation by graphs of all of the electrical structure 100, including the internals of the equipment items of said electrical structure 100, is easily feasible. Furthermore, this digital representation can easily be modified to test hypotheses on modification of the electrical structure 100.

The duly constructed digital representation makes it possible to harmonize different contextual data that may originate from different databases, such as, for example, a database containing architecture information of an aircraft model and a database containing configuration customization information for airlines for which aircraft according to said aircraft model have been produced. The digital representation then links these data together to structure them, contextualize them, and create lines of exploration for different design or diagnostic hypotheses. A method for analysing the electrical structure 100 can thus be easily implemented. Indeed, by virtue of the duly nested graphs, a graph browse makes it possible to easily find the equipotentials in the electrical structure 100. Thus, by starting from a termination point or an input of an equipment item or an output of an equipment item, a graph-browsing algorithm makes it possible to find all the equipotentials from this termination point or from this input or from this output (respectively).

More particularly, by knowing a discontinuity distance obtained by reflectometry from this termination point or this input or this output in the real electrical structure 100 of the aircraft 10, an analysis of the equipotentials makes it possible to determine where this discontinuity is likely to be located and assess whether this discontinuity conforms to the electrical structure 100 as planned or whether this discontinuity corresponds to a failure or a fault of production of the electrical structure 100 in the aircraft 10. The flow diagram of FIG. 4 thus presents, in a particular embodiment, a use of this digital representation to assist in locating and correcting a failure or a fault in the electrical structure 100 of the aircraft 10.

In a step 401, a failure or a fault is detected in the electrical structure 100 of the aircraft 10. For example, this failure or this fault is detected following validation operations during the assembly of the aircraft 10 in production.

In a step 402, a reflectometry operation is performed on the electrical structure 100 from a termination point or from an input of an equipment item or from an output of an equipment item. The reflectometry operation makes it possible to determine the distance in the electrical structure at which there is a break with respect to the termination point or to the input of the equipment item or to the output of the equipment item concerned.

In a step 403, the processing system 300 obtains a digital representation of the electrical structure 100 of the aircraft 10. The digital representation is constructed as described above in relation to the step 400, and is therefore composed of two nested graph levels.

In a step 404, the processing system 300 performs a search for equipotentials by browsing through the nested graphs. A graph-browsing algorithm, for example of deep browsing type, or DFS (for "depth-first search") type, or of width-browsing type, or BFS (for "breadth-first search"), can be used to do this, notably through the use of artificial intelligence. The deep browsing algorithm DFS is particularly indicated for failure or fault diagnostic purposes.

The graph-browsing algorithm manages the nesting of the two graph levels: when the algorithm encounters, in the browsing of the first graph, an equipment item having an internal interconnection structure, the algorithm switches over to the second graph defined for the equipment item concerned to continue the search for equipotentials, and switches back to the browsing of the first graph when said second graph has been browsed.

The search for equipotentials can relate to all the equipotentials of the electrical structure 100 as described in the digital representation. Since the equipotentials are independent of one another in their creation, a parallel processing can be implemented for their search, by starting from the different possible points of the electrical structure 100. For example, a MapReduce (from the company Google) or multithread approach can be used to reduce the computation time.

In the context of diagnosing the failure or the fault detected in the step 401, the search for equipotentials relates more particularly to the determination of the equipotentials that correspond to the termination point or the equipment item input or the equipment item output from which the reflectometry operation was performed in the step 402. That makes it possible to browse only the part of the graphs that are useful to the diagnostic, and thus limit the computation time, the necessary processing resources, and the energy consumption for the implementation of the diagnostic process. That indicates the distance without discontinuity of connection that is assumed to exist in the electrical structure 100 from the termination point or the equipment item input or the equipment item output from which the reflectometry operation was performed in the step 402. Furthermore, that makes it possible to identify, by taking account of the cabling length in the first graph and the interconnections present in the second graph or graphs, the point of the electrical structure 100 where the failure or the fault detected seems to be present.

Such a digital representation further makes it possible, in the context of diagnosing the failure or the fault detected in the step 401, to modify hypotheses on the configuration of equipment items of the electrical structure 100, search for new equipotentials with this new configuration, and thus assess whether the failure or the fault detected would simply not be due to a poor equipment item configuration.

In a step 405, the processing system 300 supplies a nested graph-browsing equipotential search result. The result can be supplied in textual or graphic form. The result can be displayed immersed in a three-dimensional mock-up of the aircraft by revealing the equipotentials found (for example, when each equipment item is precisely located in the aircraft model considered). Other types of human-machine interfaces can also be used. The result can also be communicated to another system or machine to perform other processing operations.

In a step 406, an intervention is made to correct the detected fault or repair the detected failure. By virtue of the assistance provided by the digital representation and the search for equipotentials, the locating of the failure or of the fault has been facilitated. Thus, the possible dismantling of elements of the aircraft, such as cabin cladding panels for example, in order to access portions of the electrical structure 100 where the failure or fault concerned is likely to be located, is targeted.

The invention claimed is:

1. A method for assisting in locating and correcting a fault or defect in an electrical structure of an aircraft, wherein the electrical structure comprises equipment items interconnected by cables, the method comprising the following steps performed by a processing system including electronic circuitry:

constructing a digital representation of the electrical structure, wherein the digital representation includes nested graphs representing the electrical structure, wherein the nested graphs include:

a first graph representing the electrical structure by first nodes and first arcs, wherein the first arcs represent the cables of the electrical structure and the first nodes represent the equipment items of the electrical structure interconnected by the cables, and second graphs each representing a corresponding one of the first nodes and each of the second graphs represent an internal structure of interconnection between at least one input and at least one output of the equipment item represented by the corresponding first node, and wherein each of the second graphs include a representation of an internal interconnection structure of the equipment item represented by the corresponding first node, wherein the representation includes second arcs representing interconnections of the internal interconnection structure between inputs and outputs, and second nodes representing the at least one input and the at least one output of the equipment item represented by the second node, wherein the first graph is obtained from contextual data relating to the electrical structure and each of the second graphs are obtained from a generic model associated with a type of equipment item represented by the second graph;

performing a reflectometry operation on the electrical structure from a termination point in the electric structure, from an input of one the equipment items or from an output of one the equipment items, wherein the reflectometry operation determines a distance in the electrical structure from the termination point or the input or the output of the one of the equipment items to a fault or failure in the electric structure, performing a search for and identifying equipotentials in the digital representation by browsing through the nested graphs, wherein the search for equipotentials is performed from the first node corresponding to the termination point, the input of the one of the equipment items or the output of the one of the equipment items;

identifying locations on the digital representation the electrical structure based on the equipotentials which correspond to locations where a fault or failure may be present in the electrical structure; and repairing or correcting the fault or failure by modifying the electrical structure at the location of the fault or failure.

2. The method according to claim 1, wherein the browsing of the nested graphs is performed using a deep browsing algorithm.

3. A method for assisting in locating and correcting a fault or defect in an electrical structure of an aircraft, and the method includes:

generating a digital representation of the electrical structure, wherein the generation of the digital representation includes:

generating a first graph representing the electrical structure, wherein the first graph includes first nodes that each represent a respective one of the equipment items and first arcs each representing a respective one of the cables, wherein the first arcs interconnect the first nodes in a manner representative of the cables interconnecting the equipment items in the electrical structure; and generating second graphs each representing a respective one of the equipment items and corresponding to one of the first nodes, wherein each of the second graphs include second nodes representing inputs and outputs of the corresponding first node and second arcs representing interconnections of the inputs and the outputs in the corresponding first node;

wherein the first graph is obtained from contextual data relating to the electrical structure and the second graphs are obtained from models each representing a respective one of the equipment items in the electrical structure;

determining an equipotential corresponding to a fault or a failure in the electrical structure;

searching the digital representation to identify locations in the digital representation representing locations in the electrical structure having equipotentials common to the equipotential corresponding to the fault or the failure;

analyzing the locations in the electrical structure to identify a location of the fault or the failure, and repairing or correcting the fault or failure by modifying the electrical structure at the location of the fault or the failure.

4. The method of claim 3, wherein:

the determining of the equipotential corresponding to the fault or the failure includes performing a reflectometry operation on the electrical structure from at least one of: a termination point in the electric structure, an input of one the equipment items or an output of one the equipment items, wherein the reflectometry operation determines a distance in the electrical structure from at least one of: the termination point, the input or the output to the fault or the failure in the electric structure, wherein the searching the digital representation includes searching from at least one of: the termination point, the input or the output.

* * * * *